Dec. 29, 1953 R. E. SELTZER 2,664,221
LID CONSTRUCTION FOR MATERIAL SPREADERS
Original Filed Sept. 14, 1949
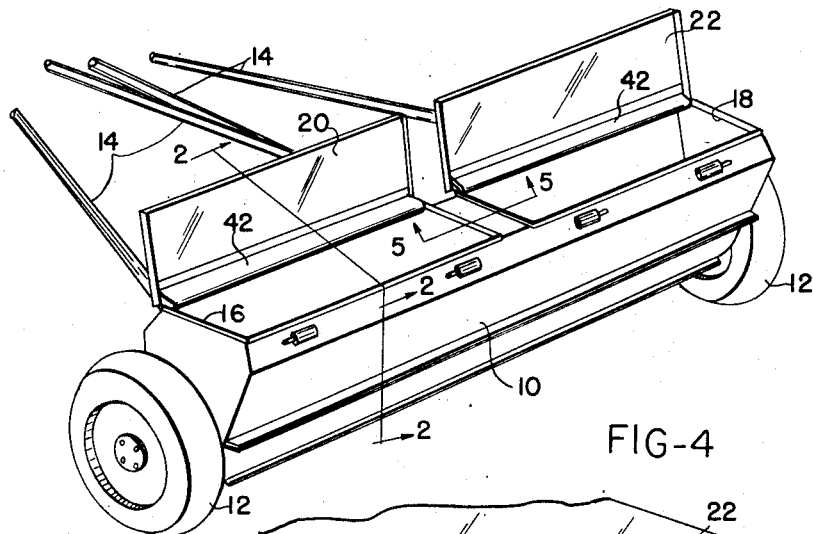
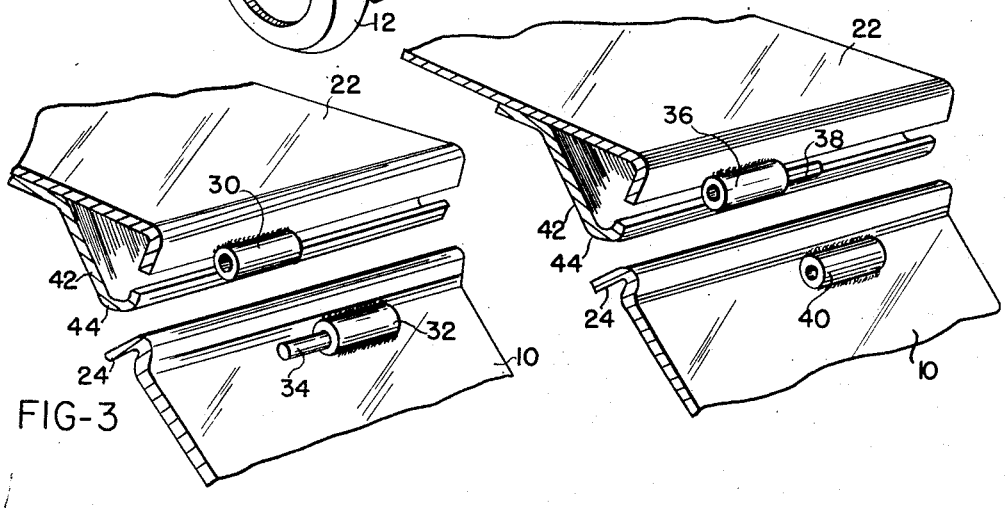
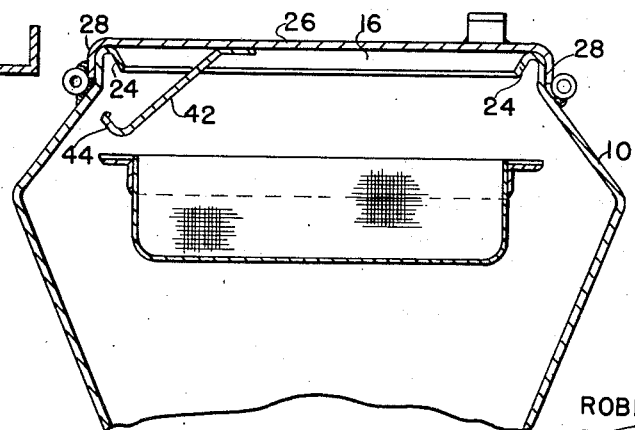
INVENTOR
ROBERT E. SELTZER
BY Toulmin & Toulmin
ATTORNEYS Patented Dec. 29, 1953

2,664,221

UNITED STATES PATENT OFFICE 2,664,221

LID CONSTRUCTION FOR MATERIAL SPREADERS

Robert Edward Seltzer, Bellevue, Ohio, assignor, by mesne assignments, to Spred-All, Inc., Bellevue, Ohio, a corporation of Ohio Original application September 14, 1949, Serial No. 115,595. Divided and this application February 13, 1952, Serial No. 271,358

2 Claims. (Cl. 220—32)

This invention relates to agricultural material spreaders, and particularly to an improved lid construction therefor having particular benefits. This application is a division of my co-pending application Serial No. 115,595, filed September 14, 1949.

Agricultural material spreaders of the nature with which this invention is particularly concerned comprise an elongated hopper arrangement mounted on wheels and having dispensing openings in the bottom of the hopper through which the material to be dispensed is discharged. The hopper is open at the top for receiving the material to be dispensed, and lids are provided for covering the opening.

Particular problems arise in connection with spreaders of the nature referred to, in that the material to be dispensed must be kept perfectly dry because it has a strong tendency to cake into solid mass when moist, and it not only becomes impossible to dispense the material properly in this condition, but it may even be necessary to clean out the entire spreader.

The materials dispensed in a spreader of this nature also vary widely as to the amount thereof dispensed, and for this reason, it is sometimes necessary to provide means for filling the spreader almost continuously during operation.

Having the foregoing in mind, the particular object of the present invention is an improved hopper and lid construction for spreaders of the nature referred to which will eliminate the difficulty of the material becoming wet, and which will greatly facilitate the filling of the spreader.

Another object is the provision of an improved hopper arrangement in which the possibility of the operator becoming injured on a sharp edge about the opening of the hopper is eliminated, as well as the possibility that a sharp edge around the opening will cut through a sack or bag from which material is being dispensed into the hopper.

A particular object is the provision of a spreader arrangement particularly adapted for being filled while in operation.

These and other objects and advantages will become more apparent upon reference to the following description taken in connection with the accompanying drawings, in which:

Figure 1 is a perspective view of a spreader constructed according to this invention;

Figure 2 is a transverse cross-section through the hopper portion of the hopper of the spreader showing the form which the hopper takes and the construction of the lid;

Figure 3 is a fragmentary perspective view showing the manner in which the hinge parts carried by the lid and hopper, respectively, are formed;

Figure 4 is a view like Figure 3, but showing a modified arrangement of the hinge construction; and Figure 5 is a sectional view, indicated by line 5—5 on Figure 1, showing the construction of the hopper at the center part when the said hopper is provided with two openings.

Referring to the drawings somewhat more in detail, the material spreader illustrated therein comprises a relatively elongated hopper 10 having ground wheels 12 at the opposite ends and a hitch structure 14 extending from the front wall of the hopper. According to well-known practices, and at least one arrangement of which is shown in my co-pending application referred to above, the ground wheels 12 are arranged for driving an agitator extending lengthwise of the hopper adjacent the bottom portion thereof for dispensing material therefrom in measured amounts.

The upper wall of the hopper is provided with openings 16 and 18, and lids are provided, as at 20 and 22, for closing the said openings.

Referring now to Figure 2, it will be seen that the openings at the top of the hopper are provided with inwardly rolled edges 24, by means of which the periphery of the opening is blunt, and therefore presents no sharp edges that might cut bags or sacks from which material was being transferred to the hopper, and likewise there is little chance of anyone becoming injured on a sharp edge around the opening.

Each opening of the hopper is provided with a lid consisting of a substantially flat panel 26 having the downwardly turned peripheral edge 28. Edge 28 fits closely about the upwardly extending flange that surrounds the opening of the hopper, and which is rolled in at 24, as described above. The lid and hopper are provided with hinge means in the form of cooperating parts carried by each thereof, as best illustrated in Figures 3 and 4. The hinge parts comprise the cylindrical members 30 welded at spaced points along the lid and the cylindrical parts 32 welded at corresponding points along the hopper. In Figure 3, a pin 34 is mounted in sleeve 32, and the lid is put on the hopper by bringing pin 34 into register with the opening in the sleeve 30, and then sliding the lid endwise until member 30 abuts member 32.

During opening and closing movements of the lid, the hinge parts will not become disengaged. In Figure 4 an inversion of the arrangement is illustrated wherein the cylindrical member 36 on the lid carries the pin 38 and the cylindrical member 40 on the hopper is adapted for receiving the pin. The Figure 4 arrangement is to be slightly preferred over the Figure 3 arrangement, because fewer pins are required. As will be seen in Figure 2, the hopper has the cylindrical members welded to both sides thereof, and thus the lid can be placed on the hopper to open either from the front or from the back.

According to this invention, the lid includes a strip 42 extending along the inside thereof and formed with a hooked end at 44 adapted for engaging under the rolled in lip 24 about the opening in the hopper. Strip or clip 42 is so shaped and positioned that the lid will be slightly over-center when the clip engages the said lip and the lid will thus be positioned when opened in the position illustrated in Figure 1.

The advantage of this arrangement is that the lids can serve as back boards for permitting the rapid filling of the spreader as by shovelling material from a towing truck or the like when the spreader is in operation. The lid arrangement with the clip also facilitates filling the hopper in the normal manner.

It will be understood that this invention is susceptible to modification in order to adapt it to different usages and conditions, and, accordingly, it is desired to comprehend such modifications within this invention as may fall within the scope of the appended claims.

I claim:

1. In a spreader for granulated agricultural materials: an elongated hopper having a filling opening at the top, said top having an upstanding peripheral edge, said edge being rolled inwardly and downwardly in a rounded manner, a reversible elongated lid for closing said opening and having a dependent marginal flange to fit around the outside of said upstanding edge when the lid is closed, separable hinge means on one longitudinal side of said lid and on both longitudinal sides of said hopper whereby the lid can be hinged to either side of the hopper, means for holding said lid in open position on either side of said hopper and in a substantially perpendicular relation to the plane of the top of said hopper, said means comprising an elongated clip secured at one end to the underside of said lid and having a hooked portion at the other end thereof, said hooked portion lockingly engaging the underside of the adjacent peripheral edge when said lid is in open position, said clip comprising a strip of material extending the full length of said hopper and together with said lid in open position forming a means for deflecting said granulated material into said hopper and for preventing said latter material from lodging between said lid and the top edge of said hopper.

2. In a spreader for granulated agricultural materials and the like: an elongated hopper having a filling opening at the top, said top having an upstanding peripheral edge, said edge being rolled inwardly and downwardly to provide a rounded smooth surface, a reversible elongated lid for closing said opening and having a dependent marginal flange conforming to the curvature of said edge and fitting in flush mating engagement around the outside of said upstanding edge when the lid is closed, separable hinge means on one longitudinal side of said lid and on both longitudinal sides of said hopper whereby the lid can be hinged to either side of the hopper, common means for preventing granulated materials from entering between the mating surfaces of said marginal flange and said upstanding edge and into said hinge and for holding said lid in open position on either side of said hopper in a substantially perpendicular relation to the plane of the top of said hopper, said means comprising an elongated clip extending the full length of said hopper and being secured along one of its sides to the underside of said lid, the other side thereof having a hooked portion for lockingly engaging the underside of the adjacent peripheral edge when the lid is in open position.

ROBERT EDWARD SELTZER.

References Cited in the file of this patent

UNITED STATES PATENTS

| Number | Name | Date |
|---|---|---|
| 45,499 | Howell et al. | Dec. 20, 1864 |
| 479,936 | Foster | Aug. 2, 1892 |
| 766,892 | Olinger | Aug. 9, 1904 |
| 1,416,019 | Hall | May 16, 1922 |
| 1,653,556 | Faber | Dec. 20, 1927 |
| 2,510,231 | Juzwiak | June 6, 1950 |